United States Patent [19]
Mauron et al.

[11] 3,796,442
[45] Mar. 12, 1974

[54] SAFETY BELT DEVICE FOR A VEHICLE

[75] Inventors: Gerard Mauron, Versailles; Georges Cognard, Colombes, both of France

[73] Assignees: Automobiles Peugeot, Paris; Regie Nationale Des Usines Renault, Billancourt, both of, France

[22] Filed: Nov. 22, 1971

[21] Appl. No.: 200,813

[30] Foreign Application Priority Data
  Nov. 27, 1970 France ............................ 70.42686
  Mar. 11, 1971 France ............................ 71.08522
  Oct. 25, 1971 France ............................ 71.38253

[52] U.S. Cl. ............................................. 280/150 SB
[51] Int. Cl. ............................................. B60r 21/10
[58] Field of Search ............... 280/150 SB; 297/417

[56] References Cited
UNITED STATES PATENTS
3,583,726   6/1971   Lindblad ..................... 280/150 SB

*Primary Examiner*—Robert R. Song
*Attorney, Agent, or Firm*—Burns, Doane, Swecker & Mathis

[57] ABSTRACT

A safety device for a seat in a vehicle body, comprising a safety belt and an arm pivotable between a first position and a second position. The belt is connected to the arm and is held in position of utilization in front of the occupant of the seat when the arm is in the second position. When the arm is in the first position the belt is in the inoperative position and the arm and/or the belt hinders the occupant. This encourages the occupant to use the safety device at all times.

16 Claims, 10 Drawing Figures

PATENTED MAR 12 1974 3,796,442

SAFETY BELT DEVICE FOR A VEHICLE

The present invention relates to devices of the type having a safety belt or strap intended to be employed in a vehicle for maintaining the occupants on their seats, for example upon collision or sudden braking.

Generally, the efficiency of such safety devices is acknowledged and this had led to the requirement of such devices on vehicles. Unfortunately, too many drivers or passengers do not employ them and one of the essential objects of the present invention is to provide a device which is so arranged that its utilization is practically compulsory.

The invention provides a safety device comprising at least one belt placed in the position of utilization in front of the occupant of a vehicle seat, wherein the belt is connected to an arm which is pivoted to a fixed part of the body of the vehicle and is capable of occupying a first position in which the arm and/or the belt constitutes a hindrance to the occupant and a second position in which the belt is maintained in the position of utilization.

Preferably, the arm is pivoted to the body at one end and carries at its other end support means and locking means which co-operate with complementary means carried by another fixed part of the body so as to maintain the arm in the second position.

According to another feature of the invention, the arm constitutes in its second position a strut between the posts of a vehicle door which strengthens the seat-containing part of the body in respect of lateral and front shocks.

According to a preferred embodiment of the invention, the belt employed is of the so-called three-point attachment type, that is to say, it constitutes a cross belt portion and an abdominal belt portion, one end of the belt being connected to a fixed part such as the floor of the vehicle whereas its other end can be connected to an inertia winding means known per se.

There can also be provided, to render the actuation of the device completely automatic, an actuating mechanism arranged to ensure at least the movement of the arm from its first position to its second position and to be brought into operation automatically when the user closes a given electric circuit of the vehicle. This circuit may be the ignition circuit, the circuit supplying the accessories or the starter circuit of the vehicle.

The actuating mechanism can comprise return means biasing the arm towards its second position, locking means for maintaining the arm in its first position in opposition to the action of the return means, said locking means being controlled by an electromagnet actuated at the same time as said given electric circuit of the vehicle.

The mechanism may also comprise means returning the arm to its second position and a reversible electric motor operated in one direction when the starter contact of the vehicle is closed and in the other direction when the starter contact is opened, end-of-travel switches being provided for stopping the motor when the arm has reached either of its two extreme positions.

In the latter case, a rabbet switch, which is closed at the same time as the door of the vehicle, can be interposed in the circuit of the arm-shifting motor so as to enable the elecric circuit of the vehicle to be closed without the arm being lowered while this door is opened and the driver is not seated on his seat. This may be of utility, for example, when some mechanical operation or repairs must be effected on the vehicle.

Further features and advantages of the invention will be apparent from the ensuing description with reference to the accompanying drawings.

In the drawings:

FIG. 4 is rather diagrammatic side elevational view of an improved device actuated automatically;

FIG. 5 is a sectional view taken on line 5—5 of FIG. 4;

FIG. 6 is a partial view similar to FIG. 4 of a modification of the automatic actuating device;

FIG. 7 is a circuit diagram corresponding to the modification shown in FIG. 6, and FIGS. 8–10 are views of modifications of means for hooking the belt to the arm.

Figure 1:
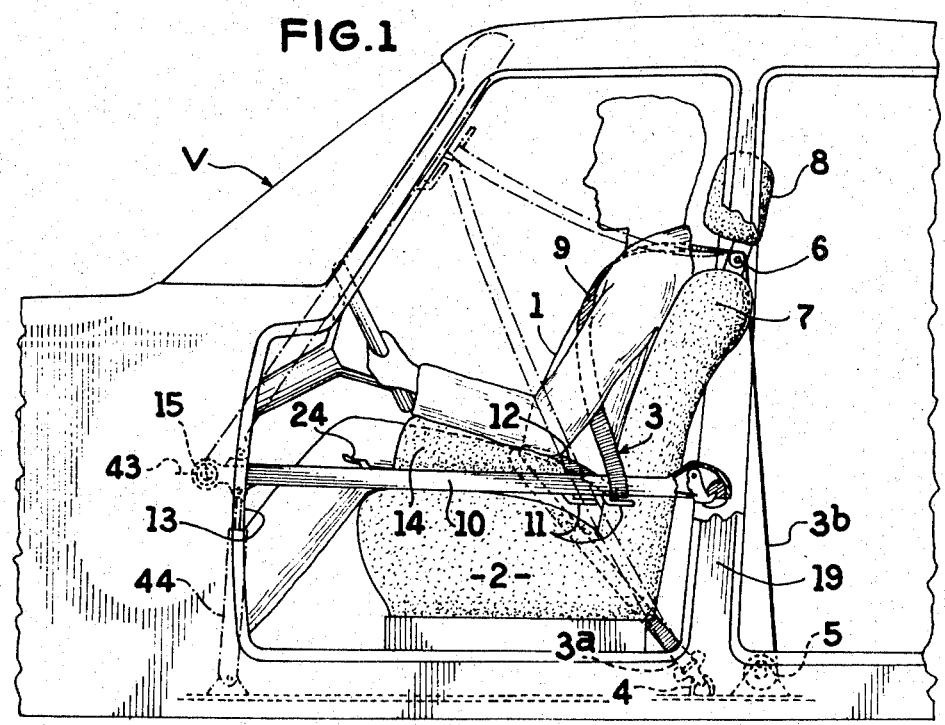
FIG. 1 is a partial side elevational view, with parts cut away, of the occupant compartment of a body of a vehicle comprising a safety device according to the invention.

Reference will be had first to FIG. 1 in which the invention is shown combined with the seat occupied in the vehicle V by the driver 1, it being understood that such an arrangement may be employed for any other of the front and rear seats of the vehicle.

The driver 1 is held on his seat 2 by a belt or strap 3. One end 3a of the belt is hooked to a fixed anchoring point or retaining means 4 located on the floor of the vehicle between two front seats and its other end 3b is engaged in the known manner in an inertia winding means 5 operative to act as retaining means in the event of collision of the vehicle and also secured to the floor between the two seats. Starting at the winding means 5, the belt 3 passes first over a horizontal bar 6 fixed to the upper part of the seat back 7 under the head rest 8, the latter being of course optional. The belt then forms a cross belt portion 9 in front of the chest of the driver, passes around an arm 10 on which it can be retained by a clasp 11 in an intermediate portion of the belt and then returns to the anchoring point 4 in forming an abdominal belt portion 12. The arm 10 forms part of means for shifting the intermediate portion to a position of utilization.

In order to allow for the possibilities of adjustment of the longitudinal position of the seat 2, several clasps 11 may be provided along the arm 10. In this case these clasps must be open at the rear as shown in the drawing so as to permit the shifting of the belt from one clasp to another. It will be understood that this possibility of seat adjustment may be neglected and only one clasp 11 provided in which case it may be closed at both ends so that it is impossible to remove the belt.

In the position of utilization, the arm 10 is disposed roughly horizontally across the opening 13 of the door and may carry an arm-rest 14. It is pivoted at its front end on a pin 15 which is fixed with respect to the body and is locked at the rear by means of any suitable device, such as that shown for example in FIGS. 2 and 3.

Figure 2:
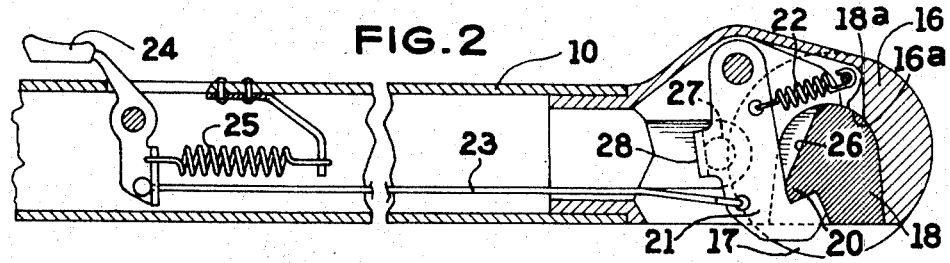
FIG. 2 is a longitudinal sectional view of a part of the arm and of its unlocking device.

In the embodiment shown in FIG. 2, the arm 10 terminates in an end portion 16 which fits between two side walls 17 on a support 18 integral with a post 19.

The end portion and the support have two support surfaces 16a, 18a of complementary shapes and the support 18 defines a hook 20 on which can be engaged a second hook 21 which is pivoted to the end portion 16. The hook 21 is biased to the hooking position by a spring 22 and is connected by a rod 23 to an actuating lever 24 which is also biased by a spring 25 and pivoted to the arm 10. The support 18 comprises an inclined ramp 26 which serves to guide the hook as the arm moves downwardly to its position of utilization. Further, the end portion 16 and the hook 21 include abutment means 27, 28 which limit the travel of the hook 21 when it is not in engagement and is biased by the spring 22.

Figure 3:
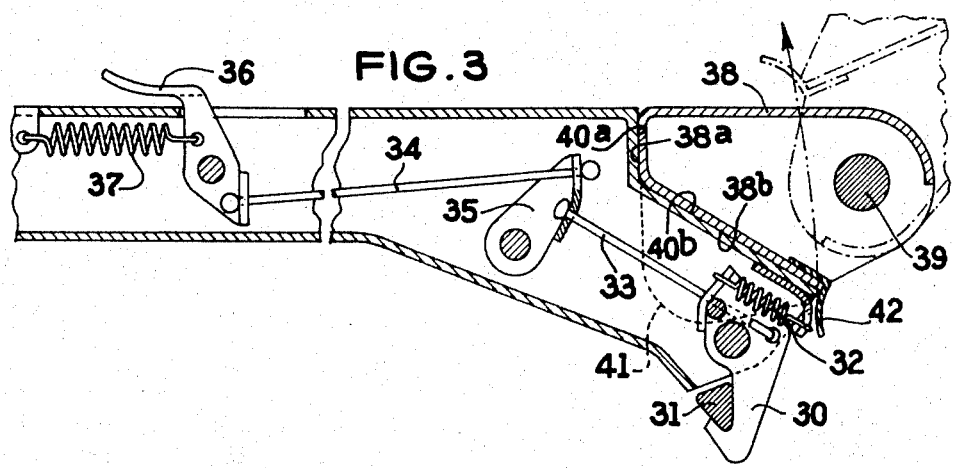
FIG. 3 is a view similar to FIG. 2 of a modification.

In the second embodiment shown in FIG. 3, the end of the arm is arranged in such manner that the two functions of abutment and locking are achieved by different means. The locking and unlocking device comprises, as in the foregoing embodiment, a hook 30 which is pivoted to the arm 10 and engageable on a lug 31 integral with the body of the vehicle. The hook 30 is biased by a spring 32 and can be unlocked by means of a linkage comprising two rods 33, 34, a lever 35 and an actuating lever 36 which is also biased by a spring 37 and pivoted to the tubular arm.

The assembly which is adapted to increase the strength of the compartment of the vehicle body when the arm is in its position of utilization comprises an abutment 38 pivotably mounted on a pin 39 which is fixed to the post 19 of the body. This abutment 38 includes support faces 38a, 38b which co-operate with corresponding faces 40a, 40b of the arm 10 and two lateral walls 41 which engage each side of the arm 10. A resiliently-yieldable return tongue member 42 ensures that the abutment is pivoted by the arm 10 when the latter is lowered to its position of utilization.

When the device is placed in its position of utilization in which in the case of FIG. 2 and FIG. 3 the arm is in a roughly horizontal position, the belt is in its position of utilization in front of the occupant of the seat as shown in full line in FIG. 1. If the driver desires to leave the vehicle, he merely has to actuate the lever 24 (FIG. 2) or the lever 36 (FIG. 3) so as to disengage the locking hook 21 or 30 and then swing the arm assembly 10 upwardly. This movement causes, in the embodiment shown in FIG. 3, the abutment 38 to rotate about its pivot pin 39 until it occupies the position shown in dot-dash line in FIG. 3. The tongue member 42 is then urged back resiliently so as to allow the passage of the end of the arm 10. A torsion spring 43 disposed around the pin 15 or a resiliently yieldable pneumatic means 44 can be provided for returning the arm to its raised position shown in dot-dash line in FIG. 1. Simple means having a resiliently yieldable locking arrangement can also ensure that the arm is retained in the raised position.

In this raised position, the opening 13 is completely unobstructed. On the other hand, the two portions of the belt which normally constitute the cross belt 9 and the abdominal belt 12 are located in front of the driver and hinders him so that he is in practice obliged to lower the arm as soon as he has taken up his position in the vehicle. It will be understood that the same is true in the case of a front or rear passenger whose has the safety device combined with his seat.

When the user lowers the arm 10, in the case shown in FIG. 2, the end portion 16 engages the complementary member 18 integral with the post 19 and, in the case shown in FIG. 3, the tongue member 42 and the abutment 38 are automatically placed in position.

In this position of utilization, the arm 10 constitutes a strut between the front part of the body and the post 19 and this considerably increases the strength of the compartment in a region usually considered relatively weak and enables it to stand up much better to front shocks, since this strut prevents the two posts of the door frame from moving towards each other, and to lateral shocks since it increases the strength of the door itself.

Figures 4, 5, 6, 7:
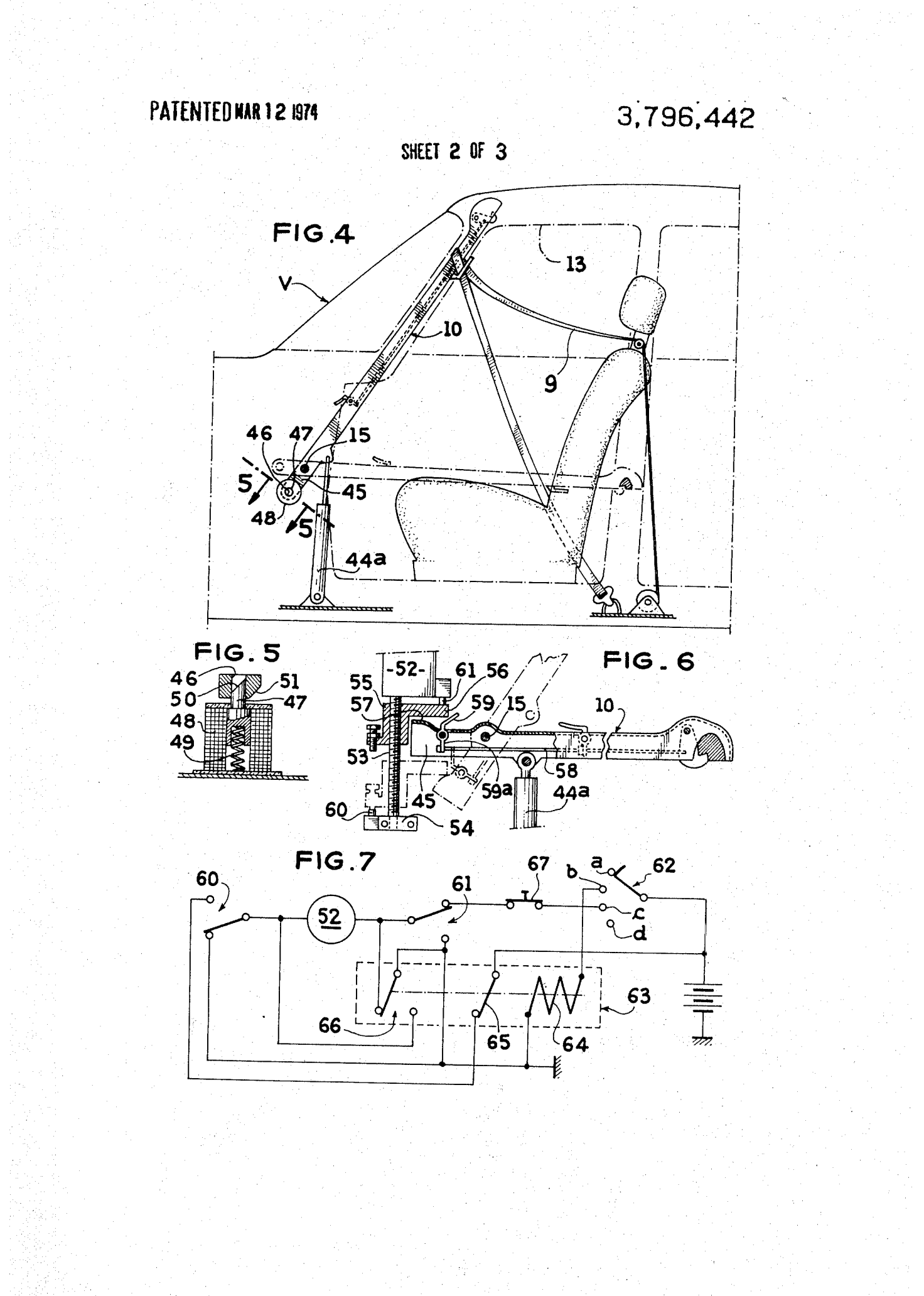

FIGS. 4 and 5 show a device comprising an arm 10 shown in full line in its withdrawn position and in dot-dash line in its lowered position in which it extends across the opening 13 of the door. A safety belt 9 passes around this arm.

The arm 10 extends beyond its pivot pin 15 in a portion 45 having an aperture 46 in which is engageable a locking finger 47 which forms part of the moving part of an electromagnet 48 integral with the body of the vehicle V. The finger 47 is biased outwardly by a spring 49. It has a chamfer 50 which co-operates with an inclined face 51 of the extending portion 45 of the arm so as to allow engagement of this detent arrangement when the arm 10 is swung manually up to its withdrawn position. The coil of the electromagnet 48 is connected in parallel with the circuit controlling the starter (not shown) so as to be energized with actuation of the starter. Return means 44a having a damped return action, known per se, is provided to urge the arm 10 to its lowered position shown in dot-dash line.

The embodiment shown in FIG. 4 operates in the following manner:

When the driver actuates the starter, the electromagnet 48 is energized and this causes the withdrawal of the finger 47. As the arm 10 is no longer retained, it moves both under the effect of gravity and the return means 44a so as to take up its lower position in which the belt 9 retains the occupant on his seat. Normally, the electromagnet 48 is now no longer energized so that no current is consumed.

By way of modification, the electromagnet 48 can be energized as soon as the main switch of the vehicle is closed. This arrangement has for drawback a permanent consumption of current but, on the other hand, its forbids maintaining the arm in the raised position so long as the engine is operating since the locking finger 47 remains in the withdrawn position.

In the modification shown in FIG. 6, the operations for placing the arm in the position of utilization and raising the arm are effected by an electric motor-reducing unit 52 which rotates a screw 53 held at its outer free end in a fixed bearing 54. A nut 55 which is movable in translation is carried by the screw 53. The nut includes a lug 56 which is located above the extension portion 45 of the arm 10 which terminates in a ramp 57. The manual unlocking mechanism of the arm described hereinbefore is completed by a rod 58 and a lever 59 which is pivoted to the arm at 59a and is located below the lug 56 of the nut when the arm is in its horizontal position.

End-of-travel reversing means 60, 61 stop the motor at the end of each operation. In the circuit diagram shown in FIG. 7 it can be seen that the motor-reducing unit 52, which is of the permanent magnet type, can be supplied with power through the main switch 62 of the vehicle by the use of a relay 63 having a coil 64, a switch 65 and a reversing switch 66.

The circuit also comprises, but this is optional, a rabbet switch 67 which is closed at the same time as the corresponding door and is adapted to prevent the lowering of the arm when, for example, the engine is turned on from outside the vehicle for making some mechanical intervention.

The embodiment shown in FIG. 6 operates in the following manner:

Starting at the position a of the switch 62 in which the engine is inoperative and the arm is raised in the position corresponding to the position shown in dot-dash line in FIG. 6 and to the diagram shown in FIG. 7, the main switch moves first to the position b corresponding to the supply of power to the accessories and this supplies power to the coil 64. The switch 65 opens and the reversing switch 66 moves to its other position. By moving to the position c, corresponding to the closure of the main switch circuit, and if the switch 67 is closed, the motor 52 is supplied with power through the reversing switch 61, the return to ground occurring through both the switch 66 and the reversing switch 60. However, as soon as the nut 65 has started its travel, the end-of-travel switch 60 is actuated and the return to ground of the motor occurs only through the switch 66. During the rise of the nut 65, the arm lowers both under the action of gravity and of the damped return means 44a and places itself across the door entrance as shown in full line in FIG. 3. When it reaches the upper end of its travel, the nut releases the lever 59 and this has for effect to lock the arm in its position of utilization, thereafter the switch 61 is actuated so as cut off the supply of power to the motor and short its winding through the reversing switches 66 and 61. Movement of the main switch to the "start" position d has no effect on the device.

It will be observed that if the engine is started up with the vehicle door open and therefore with the switch 67 open, the device comes into action as soon as the door closes.

When the main switch or starter switch is opened by bringing the switch to the position a, the coil 64 is no longer supplied with power, the switch 65 again closes and the reversing switch 66 is actuated. The motor is then supplied with power through the switch 65 and the switch 60, the return to ground occurring both through the switch 61 and the reversing switch 66. The motor then rotates in the opposite direction. However, as soon as the nut 65 starts to move, the end-of-travel switch 61 is actuated and the return to ground of the engine occurs only through the reversing switch 66.

During the downward movement of the nut 65 the lug 56 first bears against the lever 59 and causes it to pivot and unlock the arm 10 and then acts on the ramp 57 so as to raise the arm 10. When it reaches the lower end-of-travel position, the nut actuates the reversing switch 60 which cuts off the supply of power to the motor and puts its winding in short circuit through the reversing switches 60 and 66.

It should be mentioned that, if need be, it is always possible to raise the arm 10 manually for leaving the vehicle, even if the nut 55 is in its lower position.

Figure 8:
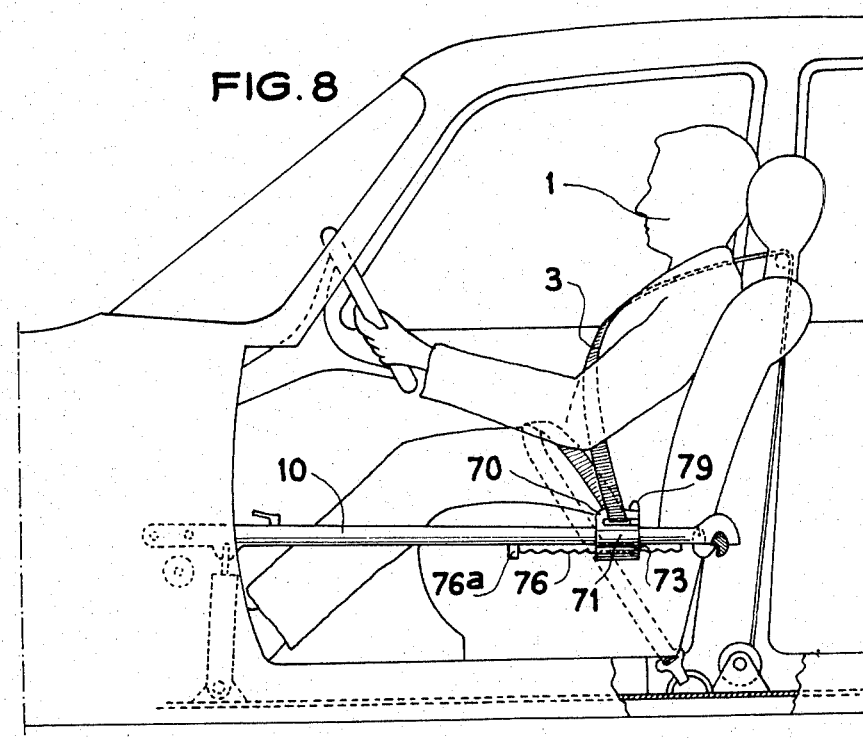
Figure 9:
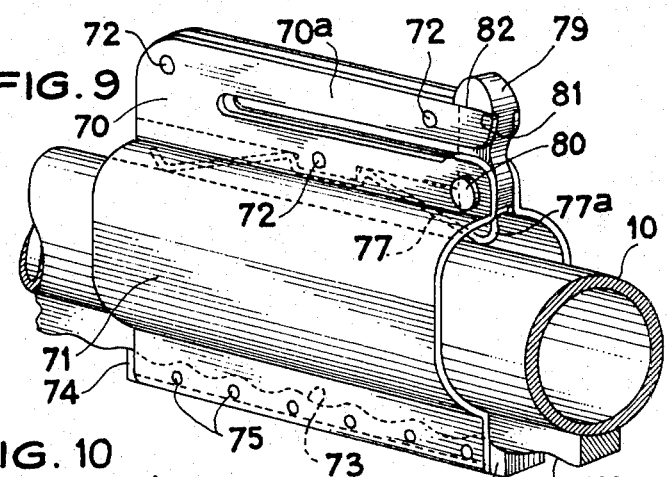
Figure 10:
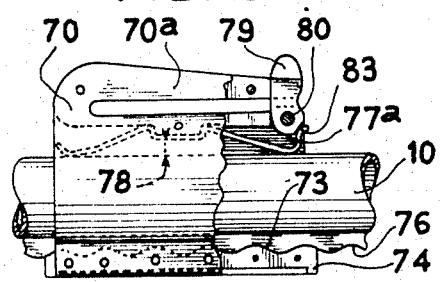

In the modification shown in FIG. 8–10, the clasp 70 which engages the belt is integral with the upper part of a stirrup 71 surrounding the arm 10. The clasp is fixed to the stirrup for example by rivets 72.

The inner part of the stirrup 71 opposed to the clasp 70 includes toothing or a rack 73 having rounded teeth maintained by steps 74 and rivets 75. The corrugations of this rack 73 co-operate with corresponding corrugations of a rack 76 which is fixed under the arm 10 and may be provided with at least one abutment 76a preventing the escape of the stirrup and determining an extreme position of abutment. A permanent contact between the corrugations of the two racks is ensured by the action of a spring 67 interposed between the arm 10 and the clasp 70.

It will be observed in FIG. 10 that a clearance 78 is provided between the stirrup 71 and the tube 10 so that when a force is exerted in opposition to the action of the spring 77 the distance between the two racks is sufficient to allow the sliding of the stirrup assembly along the arm.

The stirrup assembly is completed by a latch 79 which is pivotably mounted on a pin 80 and provided to prevent the strap or belt from escaping from the clasp. This latch has a T-shaped section and includes two ramps 81 which engage, in the closed position of the latch, two flat faces 82 of the upper branch 70a of the clasp. It is maintained in this position by a curved end portion 77a of the spring 77 which bears against a ramp 83 on the latch.

The device just described operates in the following manner:

When the arm is in its position of utilization, the clasp 70 is located in the outer end part of the arm (FIG. 8). To shift the hooking or clasp device, it is sufficient to exert with the hand a pressure in the downward direction in opposition to the action of the spring 77 to cause the stirrup to slide to the desired position and then release the stirrup. It is then immediately in position to perform its function. When a sudden braking occurs, the pull exerted by the belt on the clasp has for effect to reinforce the pressure at which the racks bear against each other and this prevents any sliding of the clasp device along the arm. The latch 79 moreover increases the strength of the clasp by precluding separation of the branch 70a from the stirrup.

It can be seen that the belt does not pass under the arm 10 and it is easy to disengage it by opening the latch 79 if, as a result of an accident, the arm 10 is blocked in position and cannot be raised. However, it will be understood that, in a modification, the clasp could be disposed under the stirrup without departing from the scope of the invention.

The fact of providing an adjustable stirrup carrying the clasp affords two important advantages. The clasp to which the belt is hooked can be closed and this enhances the safety by preventing any disengagement of the belt. The possible adjustment is fine and it is unnecessary to provide a plurality of clasps along the arm 10.

Having now described our invention what we claim and desire to secure by Letters Patent is:

1. A safety device in combination with a seat having a generally horizontal occupant-supporting portion, and a vehicle body having a fixed part supporting the seat and having a doorway at the side of the seat, said device comprising a safety belt having a first portion and a second portion remote from the first portion and connected to said fixed part, retaining means located remote from said doorway and combined with the first belt portion for retaining the first belt portion relative to said fixed part in the event of collision of the vehicle, said belt including an intermediate portion between said first and second portions, shifting means movable in an area between the seat and the doorway for shifting the intermediate belt portion downwardly to a position extending across an occupant on the seat so as to put the belt in a position of utilization, the shifting means comprising a rigid elongated arm having a first portion pivotably mounted to said fixed part at the forward side of said doorway and having a second arm portion spaced from said first portion, and means on the second arm portion for engaging the intermediate belt portion and causing the intermediate belt portion to move with the arm, the arm being pivotable between an upper position in which the belt is suspended in an inoperative position in front of and in spaced relation to the seat and a lower position in which the intermediate belt portion is lowered, thereby placing the belt in the position of utilization applied against an occupant on said seat, said arm being disposed at a height above said generally horizontal seat portion and having a greater length than said doorway such that when said arm is in said lower position the arm is between said doorway and said seat forming a barrier for an occupant on said seat, first support means and first locking bar extends above seat means supported on the vehicle body at the rearward side of said doorway and second support means and second locking means carried by the arm adjacent an end of the arm opposed to said first arm portion and cooperable with the first support means and first locking means so as to support and maintain the arm in said lower position.

2. A device as claimed in claim 1, wherein the arm is tubular and has an end portion spaced from said first portion a distance greater than said second portion, said end portion having a first support face constituting said second support means, said first support means including a support member secured on said vehicle body at the rearward side of said doorway, said support member having a second support face cooperable with the first support face so as to support the arm in said second position, a hook pivoted to the end portion, said first locking means including a hooking face on said support member and hookable by the hook in said second position on the arm.

3. A device as claimed in claim 2, comprising resiliently yieldable means for biasing the hook to a position for hooking the hooking face, and abutment means on the arm for limiting the travel of the hook when it is not engaged with the hooking face.

4. A device as claimed in claim 2, wherein the support member defines a ramp facilitating the engagement of the hook.

5. A device as claimed in claim 1, wherein the second locking means comprise a hook pivoted to the arm the first locking means comprise a fixed lug on the vehicle body, the first support means comprise a pivotal element which is mounted for pivotal movement relative to the vehicle body and has a first support face, said end of the arm opposed to said first arm portion having a second face comprising said second support means which is engageable with the first face to support the arm in said lower position.

6. A device as claimed in claim 1, comprising means for releasably maintaining the arm in the upper position.

7. A device as claimed in claim 1, comprising means for yieldingly biasing the arm into said upper position.

8. A device as claimed in claim 1, comprising a torsion spring for biasing the arm to the upper position.

9. A device as claimed in claim 1, comprising a resiliently yieldable pneumatic device for biasing the arm to the upper position.

10. A device as claimed in claim 1, comprising a resiliently yieldable detent device for maintaining the arm in the first position.

11. A device as claimed in claim 1, wherein the arm in said lower position constitutes a strut between posts of a door of the vehicle body so as to increase the strength of the vehicle body as concerns lateral and front shocks on the vehicle body.

12. A device as claimed in claim 1 wherein said arm is tubular, said arm carrying a manual actuating member extending laterally from the arm, and internal linkage interconnecting the actuating member and the locking means for affording manual unlocking of the arm.

13. A safety device in combination with a seat having a generally horizontal occupant-supporting portion, and a vehicle body having a fixed part supporting the seat and having a doorway at the side of the seat, said device comprising a safety belt having a first end and a second end and an intermediate portion, first retaining means located on a first side of the seat and connected to the first end for retaining the first end in the event of collision of the vehicle, second retaining means located on said first side of the seat and combined with the second belt end for retaining the second belt end in the event of collision of the vehicle, shifting means for shifting the intermediate belt portion downwardly to a position on a second side of the seat opposite to said first side so as to put the belt in a position of utilization, the shifting means comprising an arm located on said second side of the seat and having a first portion pivotably mounted on said fixed part of the vehicle body at the forward end of said doorway and a second portion, and means connecting the intermediate belt portion to the second arm portion, the arm being pivotable between a first arm position in which first arm position the second arm portion is in an upper position and the belt is suspended between the second arm portion and the first and second retaining means in an inoperative position in front of and in spaced relation to the seat occupant and a second arm position in which the arm maintains the belt applied against the occupant in said position of utilization, said arm being disposed at a height above said generally horizontal seat portion and having a greater length than said doorway such that when said arm is in said second position the arm is between said doorway and said seat and serves as a barrier for an occupant on said seat, first support means and first locking means supported relative to a fixed part of the vehicle body and second support means and second locking means carried by the arm adjacent an end of the arm opposed to said first arm portion and cooperable with the first support means and first locking means so as to support and maintain the arm in said second arm position.

14. A device as claimed in claim 13, wherein one of the retaining means comprises a member fixed to said fixed part of the vehicle body and the other retaining means comprises an inertia winding device.

15. A device as claimed in claim 13, wherein the means for connecting the intermediate belt portion to the arm comprise a clasp in which the belt is engaged.

16. A safety device in combination with a seat having a generally horizontal occupant-supporting portion and a vehicle body having a frame supporting the seat and having a doorway at the side of the seat, said device comprising a safety belt, means attaching the belt to the vehicle frame to anchor the belt in the event of a collision, said belt including a safety portion remote from the attaching means, the safety portion being movable toward and away from a position of utilization in which said safety portion extends across the seat and engages an occupant on said seat, shifting means movable in an area between the seat and the doorway for shifting the safety portion downwardly so as to put the safety portion in the position of utilization, the shifting means comprising a rigid elongated arm having a first portion pivotably mounted to said fixed part at a location forward of the forward side of said doorway and having a second arm portion receiving the safety portion for causing the safety portion to move with the arm, the arm being pivotable between an upper position in which the safety portion is suspended in an inoperative position in front of and in spaced relation to an occupant on the seat and a lower substantially horizontal position in which the safety portion is placed in the position of utilization, said arm, when in said lower position, being disposed between said doorway and said seat and having at least a substantial portion thereof disposed above said generally horizontal seat portion and extending rearwardly at least beyond said horizontal occupant supporting portion to form a barrier for an occupant on said seat, first support means and first locking means carried by the fixed frame at the rearward side of said doorway and second support means and second locking means carried by the arm adjacent an end of the arm opposed to said first portion and cooperable with the first support means and first locking means so as to support and maintain the arm in said lower position.

* * * * *